United States Patent [19]

Boyer

[11] 3,962,852

[45] June 15, 1976

[54] GRASS CATCHER AND DEFLECTOR ASSEMBLY

[75] Inventor: Walter J. Boyer, St. Louis, Mo.

[73] Assignee: The Perfection Manufacturing Company, St. Louis, Mo.

[22] Filed: July 22, 1974

[21] Appl. No.: 490,858

[52] U.S. Cl. ................................................. 56/202
[51] Int. Cl.² ........................................ A01D 35/22
[58] Field of Search ............. 56/202, DIG. 20, 17.4, 56/10.2, 9, 7, 320.2, 13.4; 150/1, 2, 2.6, DIG. 1

[56] References Cited

UNITED STATES PATENTS

| 3,099,123 | 7/1963 | Price | 56/202 |
|---|---|---|---|
| 3,423,918 | 1/1969 | Siwek | 56/202 |
| 3,706,190 | 12/1972 | Taub | 56/202 |
| 3,726,069 | 4/1973 | Cope | 56/202 |
| 3,797,214 | 3/1974 | Erdman et al. | 56/202 |
| 3,820,313 | 6/1974 | Hoffman | 56/202 |
| 3,893,284 | 7/1975 | Thon et al. | 56/202 |

FOREIGN PATENTS OR APPLICATIONS

| 716,774 | 8/1965 | Canada | 56/202 |

Primary Examiner—Hugh R. Chamblee
Assistant Examiner—James D. Hamilton
Attorney, Agent, or Firm—Cohn, Powell & Hind

[57] ABSTRACT

A grass catcher and deflector assembly includes a bracket attached to the lawn mower to provide a pivotal mounting for a deflector having a forwardly projecting arm which is depressed to move the deflector away from a deflecting condition relative to the mower discharge opening. The grass catcher is removable and includes a frame having a forward portion which is engageable with the bracket and the deflector arm to latch the deflector in the non-deflecting condition.

5 Claims, 4 Drawing Figures

U.S. Patent    June 15, 1976    3,962,852
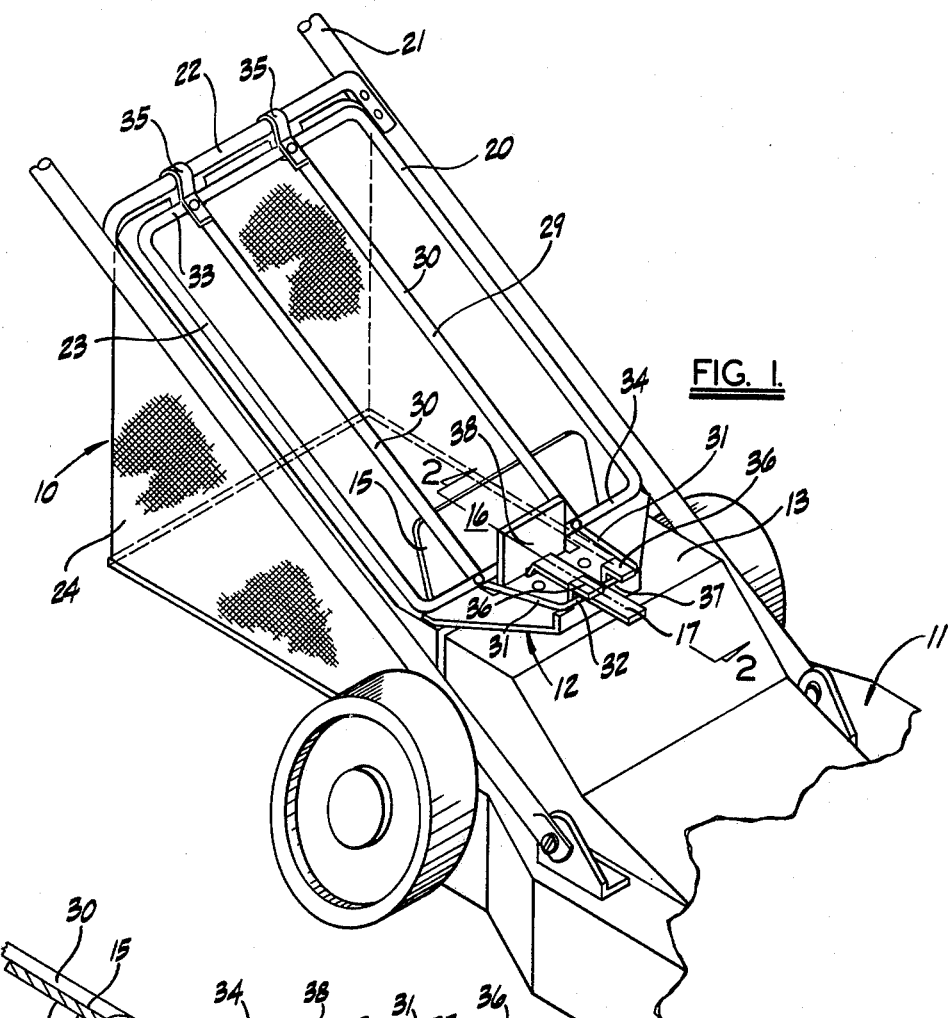
FIG. 1.
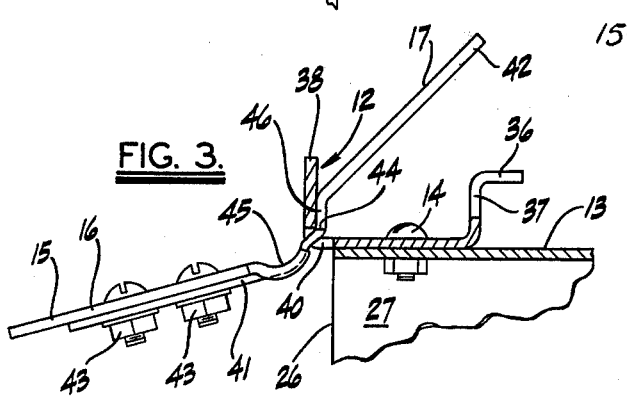
FIG. 2.
FIG. 3.
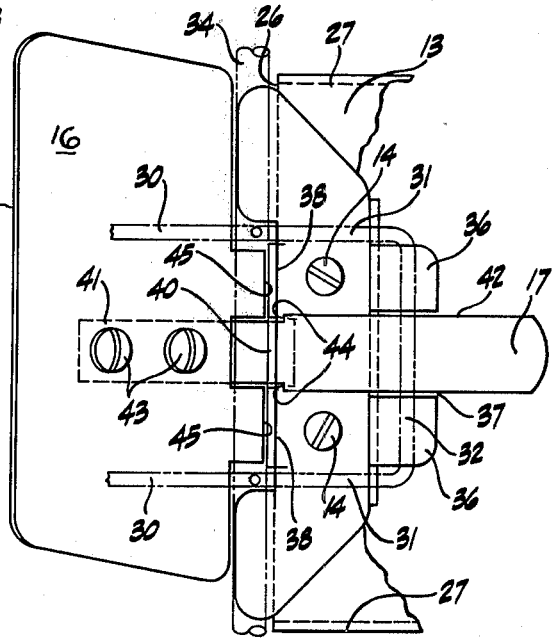
FIG. 4.

GRASS CATCHER AND DEFLECTOR ASSEMBLY

BACKGROUND OF THE INVENTION

This invention relates generally to a grass catcher and deflector assembly for a lawn mower, and particularly to a deflector which is automatically returned to a deflecting condition when the grass catcher is removed.

Deflector assemblies are known which perform a similar function to the present device to the extent that they are intended to provide at least a partial obstruction for the mower discharge opening. One such device, which is intended for use with a side opening lawn mower, provides a deflector incorporating a lever mounted to a deflector closure plate for lateral pivotal movement of the lever relative to the closure plate to latch this plate in a fully closed condition. The arm must be unlatched by pivotal movement relative to the plate before it can be raised from the closed position to permit the grass catcher to be installed.

The present device represents an improvement over this and other known deflector assemblies.

SUMMARY OF THE INVENTION

This grass catcher and deflector assembly is for use with a lawn mower having a rearwardly disposed discharge opening. The assembly includes a slotted bracket, which is attached to the lawn mower housing, and which provides a rearwardly disposed pivotal mounting for a deflector. The deflector includes a forwardly extending arm and a fixedly attached, relatively heavy, rearwardly extending flap. The flap holds the deflector in the deflecting condition automatically under gravity when the grass catcher is not installed. The bracket also includes forwardly disposed, overlying portions spaced to receive the depressed deflector arm therebetween, and the grass catcher includes a frame having a forward portion cooperating with the overlying bracket portions to maintain the deflector arm in the depressed condition so that the deflector flap is in the raised, non-deflecting condition when the grass catcher is installed.

It is an important object of this invention to provide a bracket adapted to be attached to a lawn mower housing, said bracket including a first engagement means, forwardly disposed of the mower discharge opening and overlying the upper wall of the housing in spaced relation thereto, and a slotted second engagement means pivotally mounting a deflector; said deflector including a forwardly disposed arm depressible below said first engagement means, and an attached flap which is raised into a non-deflecting position when the arm is depressed.

It is another important object of this invention to provide a removable grass catcher, said catcher including an opening adapted to receive grass clippings from the discharge opening of the mower, and said catcher including frame means providing a first transverse element insertable between the bracket overlying first engagement means and the arm to latch the deflector in the non-deflecting condition.

It is another object to provide a forward portion of the arm with stop means engageable with the second engagement means, and to provide the flap with stop means engageable with the second engagement means to preclude forward movement of the deflector.

A further object is to provide the bracket with a pair of inverted L-shaped lugs providing overlying portions spaced to define a gap receiving the forward arm portion therebetween, said arm portion being movable a sufficient distance therebelow to permit the grass catcher frame first transverse element to be inserted between said overlying portions and said arm whereby to latch said flap in the raised, non-deflecting condition when the grass catcher is installed.

An important object is to form a substantially vertical lug on the bracket to provide the second engagement means, and to provide the grass catcher frame with a second transverse element spaced rearwardly of said first transverse element and engageable with said lug to preclude forward movement of said grass catcher.

It is an important object of this invention to provide a cooperating grass catcher and deflector assembly which is relatively simple to manufacture and install, and which is easy to use by an operator without special instruction.

BRIEF DESCRIPTION OF THE DRAWING

FIG. 1 is a fragmentary perspective view showing the grass catcher in the installed condition;

FIG. 2 is an enlarged fragmentary cross sectional view taken on line 2—2 of FIG. 1, showing the deflector flap in the raised, non-deflecting condition;

FIG. 3 is a similar view showing the deflector flap in the lowered, deflecting condition; and FIG. 4 is a plan view showing the deflector flap in the raised non-deflecting condition.

DESCRIPTION OF THE PREFERRED EMBODIMENT

Referring now by characters of reference to the drawing and first to FIG. 1 it will be understood that the grass catcher, indicated generally by numeral 10, is attached to a lawn mower housing 11 by means of an adaptor bracket 12. The bracket 12 is connected to the housing upper wall 13, as by fasteners 14, and a deflector 15 is mounted to said bracket for pivotal movement of a deflector flap 16 by means of a fixed arm 17, said arm 17 being depressed to move said flap 16 between a lowered, deflecting condition (FIG. 3) and a raised, non-deflecting condition (FIG. 2). The deflector 15 is maintained in the raised non-deflecting condition by the front end of the grass catcher frame 20, when said catcher is installed by mounting the frame front end to the bracket 12 and the frame rear end to the crosspiece 22 of the lawn mower handle 21. The deflector 15 is maintained in the non-deflecting condition until the grass catcher is removed from the bracket 12, at which time the deflector flap 16 moves automatically, under gravity, into the deflecting condition.

Turning now more specifically to the structural arrangement of parts, it will be understood from FIGS. 1 and 2 that grass catcher frame 20 includes a rectangular member 23 from which a bag 24 is suspended, and that the bag 24 includes a front opening 25, which is in register with a mower discharge opening 26, said opening 26 being defined by the housing upper wall 13 and the housing side walls 27. The grass catcher frame 20 also includes a generally U-shaped member 29 having longitudinally extending arms 30 providing forward portions 31 connected by a transverse bight 32. The arms 30 are connected, as by riveting, to the transverse arms 33 and 34 of the rectangular member 23, and said arms 30 are provided with hooks 35 at the rear end for mounting the grass catcher frame 20 to the mower handle crosspiece 22. The bight 32 of the U-shaped member 29 constitutes a first transverse element, and projects beyond the bag opening 25 to engage with the bracket 12 when the grass catcher 10 is installed. The transverse arm 34 of the rectangular member 23 constitutes a second transverse element and also engageable with the bracket 12 when the grass catcher 10 is installed.

The bracket 12 includes a pair of inverted, L-shaped elements 36 at the forward end having a gap 37 therebetween, said elements 36 providing a first engagement means disposed in spaced overlying relation from said upper wall 13. The bracket 12 also includes a substantially vertical slotted element 38 providing a second engagement means rearwardly disposed of said first engagement means. The slot 40 in said element 38 provides a means by which the deflector 15 is pivotally mounted to the bracket 12, as will now be described.

As shown in FIG. 4, the arm 17 of the deflector 15 includes a rearward portion 41 narrower than the length of the slot 40 and a forward portion 42 wider than said slot. This structural arrangement of parts permits the relatively narrow rearward portion 41 to be received within the slot 40 and to be then attached to the deflector flap 16, as by fasteners 43. The juncture of the two portions 41 and 42 defines shoulders 44 which engage the forward side of the slotted element 38 to preclude rearward movement of arm forward portion 42, and therefore of the deflector 15, out of the slot 40. The deflector flap 16 includes a reduced portion at the forward end which provides spaced lugs 45, engageable with the rearward side of the slotted element 38 to preclude forward movement of the flap 16, and therefore of the deflector 15, out of the slot 40. In effect, the deflector 15 can be pivoted within the slot 40 but is retained against longitudinal movement, said shoulders 44 and lugs 45 providing stop means.

When the grass catcher is not installed, the deflector automatically assumes the deflecting condition illustrated in FIG. 3. The reason for this is that the deflector flap 16 is considerably heavier than the deflector arm forward portion 42, with the result that it tends to rotate counterclockwise under it own weight. In this position, the flap 16 is downwardly inclined at a suitable angle to deflect rocks and the like, which would otherwise issue from the mower discharge opening 26 at a dangerous angle, and thereby eliminates this hazard to the operator walking behind the mower. The desired angle of inclination of the flap 16 is achieved in the preferred embodiment by suitably bending the deflector arm forward portion 42 so that an engagement face 46 is provided, which engages the rearward side of the slotted bracket element 38 at the required angle. It will be clear that the deflector arm 17 provides a lever by means of which the deflector flap 16 can be pivoted to a raised non-deflecting condition when the arm 17 is depressed. When the arm 17 is depressed, the forward portion 42 enters the gap 37 between the bracket L-shaped elements 36 until the abutment 39 defining the bottom of the gap 37 is engaged. At this time, the bight 32 of the grass catcher frame 20, with the frame suitably tilted upwardly at its rearward end, can be inserted under the overlying portion of the L-shaped elements 36 to block upward movement of the arm forward portion 42 and effectively latch the deflector 15 in this position. The grass catcher frame 20 can then be rotated counterclockwise about a pivot axis defined by the bight 32, and the frame 20 lowered until the frame transverse member 34 is positioned behind the slotted bracket element 38, as shown in FIG. 2, and the frame hooks 35 mountingly engage the mower handle crosspiece 22, as shown in FIG. 1.

It will be understood that the grass catcher 10 is removed as by rotating it clockwise about the pivot axis provided by the bight 32 until the transverse member 34 is clear of engagement with the bracket slotted element 38. At this time, the frame 20 can be moved forward slightly to disengage the bight 32. When the grass catcher 10 is thus removed, the deflector flap 16 falls automatically, under gravity, into the deflecting condition.

I claim as my invention:

1. In combination with a lawn mower housing of the type having a discharge opening and an upper wall above the discharge opening, a grass catcher and deflector assembly, said assembly comprising:
   a. a bracket adapted to be fixedly attached to said housing upper wall and including:
      1. a first engagement means disposed forwardly of said mower discharge opening and having a portion spaced from said housing upper wall in overlying relation thereto, and
      2. a second engagement means rearwardly spaced from said first engagement means and including a slot means,
   b. a deflector including:
      1. arm means mounted to the second engagement means, the arm means being received in pivotal relation within said slot means and pivotally movable below said overlying first engagement means portion, and
      2. a rearwardly extending flap means attached to said arm means and movable away from a lowered deflecting position relative to said discharge opening into a raised, non-deflecting position as said arm means moves below said overlying first engagement means portion, and
   c. a removable grass catcher having an opening adapted to receive grass clippings from the discharge opening and including frame means having a first transverse element forwardly disposed of the catcher opening and insertable between said overlying first engagement means portion and said arm means when the arm means is moved to the position below said overlying first engagement means portion to latch said deflector in said non-deflecting position.

2. An assembly as defined in claim 1, in which:
   d. the arm means includes stop means engageable with one side of the second engagement means to substantially preclude rearward movement of the deflector.

3. An assembly as defined in claim 2, in which:
   e. the flap means includes stop means engageable with the other side of said second engagement means to substantially preclude forward movement of the deflector, the said two stop means securing the arm means and flap means to the said second engagement means.

4. An assembly as defined in claim 1, in which:
   d. the bracket first engagement means portion includes spaced, overhanging lugs having a gap therebetween,
   e. the arm means includes a forward portion receivable within said gap and movable below said lugs, and f. the first transverse element of said grass catcher is insertable between said arm means forward portion and said overhanging lugs to preclude upward movement of said arm means forward portion.

5. In combination with a lawn mower housing of the type having a discharge opening and an upper wall above the discharge opening, a grass catcher and deflector assembly, said assembly comprising:
   a. a bracket adapted to be fixedly attached to said housing upper wall, and including:
      1. a pair of laterally spaced lugs having a gap therebetween, said lugs being disposed forwardly of said discharge opening, and each lug having an upwardly projecting portion and a forwardly projecting portion spaced from said housing upper wall in overlying relation thereto, and
      2. an upwardly projecting lug rearwardly spaced from said pair of lugs and including a slot,
   b. a deflector including:
      1. an arm received in pivotal relation within said slot and mounted to the slotted lug, said arm having a forwardly extending portion of a width greater than said slot to substantially preclude rearward movement of the deflector, said forwardly extending portion being downwardly movable and receivable within the gap between said spaced lugs, and a rearwardly extending portion, and
      2. a rearwardly extending flap attached to said rearwardly extending arm portion and having a width greater than said slot to substantially preclude forward movement of the deflector, said flap being upwardly movable from a deflecting position to a non-deflecting position when said arm forward portion is received within the gap between the forwardly disposed spaced lugs, and
   c. a removable grass catcher having an opening adapted to receive grass clippings from the discharge opening, and including frame means, said frame means including:
      1. a U-shaped member forwardly disposed of the catcher opening and providing a transverse bight element insertable between said arm forward portion and the forwardly projecting portion of said spaced lugs of the bracket to latch said deflector in the non-deflecting position, and
      2. a transverse element spaced rearwardly of said bight element and engageable with the upwardly projecting slotted lug of the bracket to preclude forward movement of said grass catcher.

\* \* \* \* \*